United States Patent [19]

Cirjak et al.

[11] Patent Number: 4,724,135
[45] Date of Patent: Feb. 9, 1988

[54] PREPARATION OF HIGH SURFACE AREA MIXED METAL OXIDES

[75] Inventors: Larry M. Cirjak, Burton; Richard P. Schmidt, Jr., Medina, both of Ohio

[73] Assignee: The Standard Oil Company, Cleveland, Ohio

[21] Appl. No.: 922,238

[22] Filed: Oct. 23, 1986

[51] Int. Cl.$^4$ .................................................. C01F 1/00
[52] U.S. Cl. ...................................... 423/593; 423/594; 423/596; 423/600; 423/605; 423/606; 423/608; 423/DIG. 6; 423/326; 423/327
[58] Field of Search ............... 423/593, 594, 596, 600, 423/605, 606, 608, DIG. 6, 326, 327

[56] References Cited

U.S. PATENT DOCUMENTS

| | | | |
|---|---|---|---|
| Re. 29,515 | 1/1978 | Paris et al. ........................... | 423/252 |
| 3,904,737 | 9/1975 | Paris et al. ........................... | 423/252 |
| 4,049,583 | 9/1977 | Lauder ................................. | 423/593 |
| 4,567,031 | 1/1986 | Riley .................................... | 423/596 |

FOREIGN PATENT DOCUMENTS

| | | | |
|---|---|---|---|
| 653199 | 11/1962 | Canada ................................. | 423/596 |
| 2163142 | 2/1986 | United Kingdom ................ | 423/593 |

OTHER PUBLICATIONS

"Preparation of Single Crystals of Complex Perovskite Ferroelectric and Semiconducting Compounds", vol. 4, No. 1,-1965, pp. 71-73, *Complex Perovskite Ferroelectric Compounds* by Galasso et al.
Bonnet, M. C. & R. A. Paris Lanthanide Hexacyanometallates: Part 1: Radiographic & Infrared Study of Lanthanide Hexacyanoferrates(III), Bull. Soc. Chim. Fr., Nos. 5-6, pp. 1062-1066, 1975.
Bonnet, M. C. & R. A. Paris Lanthanide Hexacyanometallates: Part 2: Radiocrystallographic and Infrared Study of Lanthanide Hexacyanobaltates(III) Thermal Decomposition—Bull. Soc. Chim. Fr., Nos. 5-6, pp. 1,067-1,070, 1975.
A Simple Technique for the Preparation of RE FeO$_3$ and RE CoO$_3$, P. K. Gallagher; Bell Telephone Laboratories, Inc., Murray Hill, N.J. (1/5/1968).
Preparation of CoLaO$_3$ Catalyst Fine Particles by Mist Decomposition Method II—H. Imai et al., Research Laboratory of Engineering Materials, Tokyo Indsti of Tech—(Mat. Res. Bull., vol. 19, pp. 1293-1300, 1984).
Electronic Structures of the LaBO$_3$(B—Co,Fe,Al) Perovskite Oxides Related to Their Catalysts—I. Kojima et al. (Surface Science, 130, 1983: pp. 50-62).

*Primary Examiner*—Patrick P. Garvin
*Assistant Examiner*—Paige C. Harvey
*Attorney, Agent, or Firm*—M. F. Esposito; J. E. Miller; L. W. Evans

[57] ABSTRACT

The process of producing high surface area mixed metal oxides comprising selecting a precursor characterized by the following formula:

$$A_xM_a[M'(CN)_c]_b \cdot nH_2O$$

x=0-4;
a=0-4;
b=0.1-4;
c=4-8;
n=0-30;
A=alkali, alkaline earth metal, Al, Si or mixtures;
M=rare earth metals, transition metals or mixture thereof; and
M'=transition metal capable of forming a cyanide (e.g. Group VIA-VIII A) or mixture thereof, and heating the precursor at a temperature rate of below 1°C/minute in a controlled atmosphere consisting essentially of O$_2$ and an inert gas to a temperature sufficient to decompose the precursor and produce the mixed metal oxide.

12 Claims, No Drawings

PREPARATION OF HIGH SURFACE AREA MIXED METAL OXIDES

BACKGROUND OF THE INVENTION

The present invention is directed to a novel procedure for the production of high surface area mixed metal oxides containing one or more small crystallite phases of the mixed metal oxides. In particular, the present invention is directed to a procedure for the production of high surface area mixed metal oxides possessing the perovskite crystalline structure.

Various literature references such as Gallagher, *Materials Research Bulletin*, Volume 3, pages 225-238, 1968; and Bonnet, et al., Bulletin Society Chime France, No. 5 & 6, pages 1062-1070, 1975; have reported simple techniques for the preparation of rare earth iron and cobalt mixed oxides produced from hexacyanometallates. The resulting mixed metal oxides disclosed in these references has been found to possess the perovskite crystalline structure. The general technique disclosed in each of these references is heating the starting hexacyanometallate compound material to temperatures greater than 1000° C. in air or pure oxygen with a heating rate in excess of 100° C. per hour to produce the mixed metal oxide possessing the perovskite structure. However, perovskites produced by this procedure are characterized as possessing extremely low surface areas on the order of $2m^2/gm$.

In a recent article by Imai et al., *Materials Research Bulletin*, Volume 19, pages 1293-1300, 1984, the authors disclose the preparation of cobalt lanthanum oxide catalysts possessing the perovskite structure and having surface areas of between 11 to $50m^2gm$. The procedure of Imai et al. includes taking a fine mist copmrising a mixed solution of the metal salts and a reagent such as ammonium chloride or polyvinyl alcohol and heat treating this mist to form particles. The particles were then fitted to produce the oxide. While the procedure of Imai et al improves the surface area of the resulting cobalt lanthanum oxide perovskite material by the formation of extremely fine particles, it is evident that it is quite complicated and clearly not economical. Applicants present invention is directed to a simple economical procedure for producing mixed metal oxides, in particular, high surface area mixed metal oxides possessing the perovskite crystalline structure.

SUMMARY OF THE INVENTION

It is the primary object of the present invention to provide a process for producing mixed metal oxides having high surface area.

It is a further object of the present invention to provide a process for the perparation of mixed metal oxides having the perovskites crystalline structure and high surface area.

Additional objects and advantages of the invention will be set forth in part in the description which follows and in part will be obvious from the description, or may be learned by practice of the invention. The object and advantages of the invention may be realized and obtained by means of the instrumentalities and combinations particularly pointed out in the appended claims.

To achieve the foregoing objects and in accordance with the purpose of the present invetion, as embodied and further described herein, the process of producing mixed metal oxides of the present invention comprises heating a precursor characterized by the following formula:

$$A_x M_a [M'(CN)_c]_b \cdot nH_2O$$ 

x=0-4;
a=0-4;
b=0.1-4;
c=4-8;
n=0-30;
A=alkali, alkaline earth metal, Al, Si or mixtures;
M=rare earth metals, transition metals or mixture thereof; and
M'=transition metal capable of forming a cyanide (e.g. Group VI-A-VIII-A) or mixture thereof;

in a controlled atmosphere comprising an inert gas and oxygen at a rate of below 1° C./minute to a temperature sufficient to decompose said precursor to produce a mixed metal oxide characterized by the formula $AMM'O_z$ where z is the number of oxygen atoms required to satisfy the valency requirements of the remaining elements and A, M and M' are defined as set forth above.

The mixed metal oxide produced by the process of the present invention can be either a single or multiphase material. If M and M' are selected from metals capable of forming a perovsite crystalline structure (e.g., La Fe, Co Fe, La Rh, La Co, Nd Co), the precipitated mixed metal oxide will be characterized by the formula $AMM'O_3$ wherein A, M and M' are defined as above.

The present invention produces mixed metal oxides by a relatively simple and economical procedure, wherein the mixed metal oxides are produced from homogeneous starting material and the resulting oxides possess a high surface area ($>2$ $m^2/gm$). The mixed metals oxides of the present invention have utility in the catalytic area and, in particular, in the formation of catalyst for use in automobile exhaust systems. Moreover, the particular mixed metal oxides of the present invention may be applied to supports such as $SiO_2$, $Al_2O_3$ and used in numerous metal chemical procedures requiring catalysts such as ammoxidation of propylene to acrylonitrile. Any other conventional support may be chosen depending upon the utility desired.

DETAILED DESCRIPTION OF THE PRESENT INVENTION

Reference will now to be made in detail to the present preferred embodiments of the present invention.

The present invention is directed to a novel process of producing high surface area mixed metal oxides. In particular, the present process is directed to producing high surface area perovskite catalysts comprising selecting a precursor characterized by the following formula:

$$A_x M_a [M' (CN)_c]_b \cdot nH_2O$$ 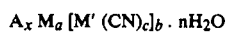

x=0-4;
a=0-4;
b=0.1-4;
c=4-8;
n=0-30;
A=alkali, alkaline earth metal, Al, Si or mixtures
M=rare earth metals, transition metals or mixture thereof; and
M'=transition metal capable of forming a cyanide (e.g. Group VIA-VIII A) or mixture thereof, heating the precursor at a rate of below 1° C./minute in a controlled atmosphere comprising an inert gas and oxygen to a temperature sufficient to decompose the precursor to produce the mixed metal oxide. The heating rate and controlled atmosphere are important factors in producing the high surface area mixed metal oxides of the present invention. The use of too much $O_2$ (e.g. greater than 30%) or a heating rate greater than 1°/minute is not suitable in the practice of the present invention.

Moreover, it should be understood that the heating of the precursor to the elevated temperature sufficient to decompose the precursor does not have to be continuous. That is, the precursor may be heated slowly to an elevated temperature (e.g., 150° C.), maintained at that temperature for a period of time (e.g., 5–10 hours) to allow stabilization of the system and then heated slowly to the temperature sufficient to produce the oxide.

In a preferred embodiment of the present invention, the controlled atmosphere comprises an inert gas such as nitrogen and Air Zero. "Air Zero" is a synthetic compressed air consisting of 21% $O_2$ and 79% $N_2$ and may be obtained from Union Carbide. It is especially preferred that the controlled atmosphere consist essentially of inert gas and oxygen, especially preferred in the practice of the present invention is a controlled atmosphere containing less than 21% $O_2$ (e.g. 1 to 2% $O_2$).

In a further preferred embodiment of the present invention, the rate of heating the precursor to the elevated temperature is between 0.6° to 0.1° C./minute, most preferably the heating rate is between 0.3° to 0.1°/minute.

In still another further embodiment of the present invention, the temperature to which the precursor is heated is no greater than about 600° C. Most preferably, the precursor is heated to a temperature no greater than 550° C.

To further illustrate the process of the present invention, the following examples are set forth below.

EXAMPLE I (Comparative)

A sample of lanthanum hexacyanoferrate was prepared by reaction of lanthanum nitrate with potassium hexacyanoferrate (III) in an aqueous solution. The lanthanum hexacyanoferrate (LaFe(CN)$_6$) possess a surface area of 1.2 m$^2$/g, with a pore volume of 0.07 cc/g for pores with radii of less than 4500 Å. cl EXAMPLE II (Comparative)

A sample of LaFe(CN)$_6$ prepared according to Example I was heated to 1000° C. in an alumina boat in a furnace in the presence of air at a rate greater than 1° C./minute and maintained at this temperature for about 2 hours. The resulting mixed metal oxide possess the perovskite crystalline structure with a surface area of 0.8 m$^2$/g and total pore volume of 0.07 cc/g for pores with radii of less than 4500 Å.

EXAMPLE III

LaFe(CN)$_6$ prepared in accordance with the procedure set forth in Example I was heated to 550° C. in a quartz tube in a furnace at the rate of 0.3° C./minute in a zero air atmosphere. The resulting mixed metal oxide (LaFeO$_3$) had a surface area of 13.8 m$^2$/g and a pore volume of 0.24 cc/g for pores with radii of less than 4500 Å. The XRD pattern of the LaFeO$_3$ produced by the procedure indicated that it possesses a perovskite crystalline structure.

EXAMPLE IV

The procedure of Example III was followed except that the sample was heated to 600° C. in a TGA system. The surface area of the resulting LaFeO$_3$ material was about 23 m$^2$/g and XRD pattern for this material indicated a perovskite crystalline structure.

The foregoing description of the preferred environments of the invention has been presented for purposes of illustration and description. They are not intended to be exhausted or limit the invention to the precise forms disclosed and obviously many modifications and variatios are possible in light of the above teachings. The embodiments were chosen and described in order to best explain the principals of the invention and its practical application to thereby enable others skilled in the art to best utilize the invention in various embodiments and with various modifications as are suited to the particular use contemplated. It is intended that the scope of the invention be defined by the claims appended hereto.

What is claimed as our invention is:

1. The process of producing high surface area mixed metal oxides comprising heating a precursor characterized by the following formula:

$$A_x M_a [M' (CN)_c]_b \cdot nH_2O$$

x=0–4;
a=0–4;
b=0.1–4;
c=4–8;
n=0–30;
A=alkali, alkaline earth metal, Al, Si or mixtures;
M=rare earth metals, transition metals or mixture thereof; and
M'=transition metal capable of forming a cyanide or mixture thereof, in a controlled atmosphere consisting essentially of an inert gas and oxygen at a rate of below 1° C./minute to a temperature sufficient to decompose said precursor to produce a mixed metal oxide characterized by the formula A M M' O$_z$ where z is the number of oxygen atoms required to satisfy the valency requirements of the remaining elements.

2. The process of claim 1 wherein the controlled atmosphere consists essentially of an inert gas and oxygen.

3. The process of claim 2 wherein said controlled atmosphere contains less than 30% $O_2$.

4. The process of claim 1 wherein said heating rate is between 0.6 to 0.1° C./min.

5. The process of claim 4 wherein said heating rate is between 0.3 to 0.1° C./min.

6. The process of claim 1 wherein M and M' are selected to provide a catalyst precursor capable of forming a mixed metal oxide having the perovskite structure.

7. The process of claim 6 wherein the controlled atmosphere consists essentially of an inert gas and oxygen.

8. The process of claim 7 wherein said controlled atmosphere contains less than 30% $O_2$.

9. The process of claim 6 wherein said heating rate is between about 0.6 to 0.1° C./minute.

10. The process of claim 9 wherein said heating rate is between 0.3 to 0.1° C./minute.

11. The process of claim 6 wherein said precursor is heated to a temperature no greater than 600° C.

12. The process of claim 11 wherein said precursor is heated to a temperature no greater than 550° C.

* * * * *